Aug. 31, 1926.
B. M. BROWNELL
1,597,669
FLEXIBLE PIPE COUPLING
Filed Jan 16, 1925
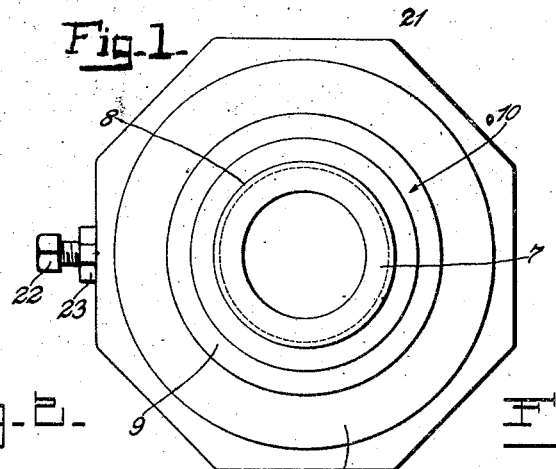
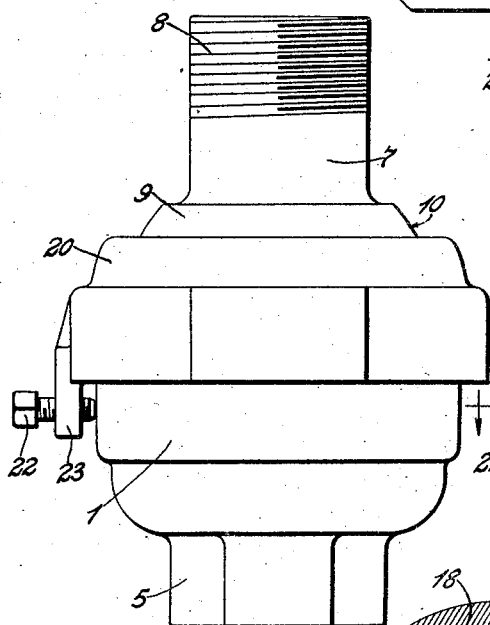
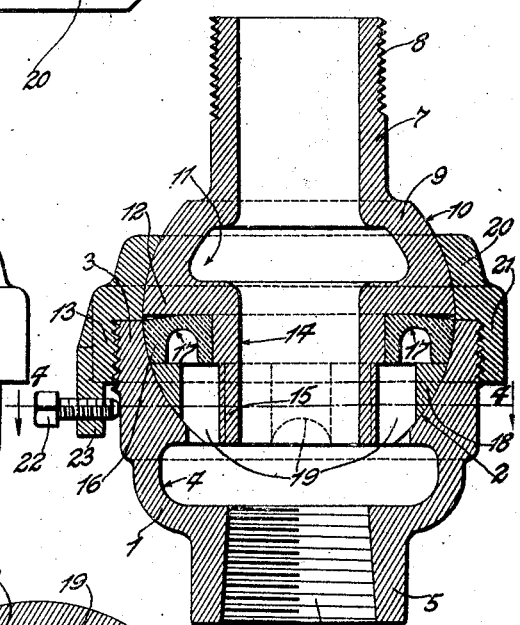
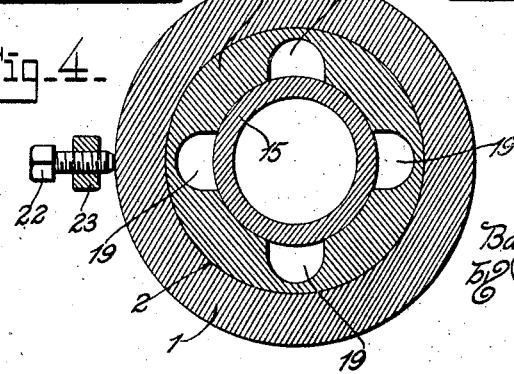
Inventor
Barnett Morse Brownell,
By Rippey Kingsland
His Attorneys.

Patented Aug. 31, 1926.

1,597,669

UNITED STATES PATENT OFFICE.

BARNETT MORSE BROWNELL, OF ST. LOUIS, MISSOURI, ASSIGNOR TO DIAMOND METAL PRODUCTS CO., OF ST. LOUIS, MISSOURI, A CORPORATION OF MISSOURI.

FLEXIBLE PIPE COUPLING.

Application filed January 16, 1925. Serial No. 2,831.

This invention relates to flexible pipe couplings, and consists in the novel construction hereinafter disclosed.

An object of the invention is to provide a flexible pipe coupling of the ball and socket type, the ball portion of the joint being made in separate sections with a flexible gasket interposed between the sections, whereby a bearing surface is formed to seat in the socket member and to relieve friction and wear on the gasket section.

Additional advantages of the construction will be apparent from the following description taken in connection with the accompanying drawing, in which Fig. 1 is a plan view.
Fig. 2 is a side elevation.
Fig. 3 is a vertical section.
Fig. 4 is a cross section on the line 4—4 of Fig. 3.

In the embodiment of the invention illustrated in the drawing the socket member is shown as comprising a casting, the upper portion 1 of which constitutes the socket member of the joint, and has a concave inner surface 2 for supporting the ball member and an exteriorly threaded surface 3. Below the concave portion of the ball receiving portion of the member the inner wall of the casting is cut out forming a circular chamber 4 that develops into a polygonal extension 5 for wrench engagement, the inner surface of said extension being threaded at 6 for joining it to an end of a pipe section.

The ball member of the socket comprises a casting having a cylindrical upper end 7 exteriorly threaded at 8 to receive a pipe coupling of a pipe section and develops into a portion 9 having a convex outer surface 10 and a circular cutout inner portion 11. The lower wall of the portion 9 of the socket member is cut inwardly to form a horizontal wall 12 against which the upper face of the gasket seats. Extending downwardly from the lower wall 13 is a tubular section 14 that reduces in diameter forming the section 15.

The gasket 16 is made preferably of semi-hard rubber and is in the form of an annulus, the outer wall of which is beveled to match the wall of the socket member and the upper wall of which is slightly beveled so that when it seats against the horizontal wall 13 there will be a slight play or movement, permitting the outward pressure of the exterior of the wall of the gasket to contact with the wall of the socket member. The lower face of the gasket is cut out to form the channel 17 so that the pressure of the fluid within the coupling will force the gasket laterally against the surface of the socket member and against the exterior wall 14 of the ball member.

Mounted on the section 15 of the socket member is a ring 18 the outer surface of which is beveled to match the wall of the socket member and the inner surface of which is circular to fit over the outer surface of the portion 15. The ring 18 has a number of spaced internal channels 19 forming passage ways between the outer surface of the section 15 to the channel 17 of the gasket. The ring 18 constitutes the lower portion of the ball member and provides a metallic bearing surface below the gasket, so that the ball member may be readily turned in the socket without friction against the outer wall of the gasket, the gasket being left free under the influence of pressure to maintain a seal between the ball and socket members.

A cap 20 having an internally threaded flange 21 threads over the end of the socket member and has its inner surface beveled to conform to the exterior surface 10 of the section 9 of the ball member. After the cap has been adjusted it may be locked in position by a set screw 22 that threads through a lug 23 carried by the cap, said set screw bearing against the exterior surface of the socket casting.

I am aware that the invention may be modified in certain particulars without departing from the spirit and scope thereof.

What I claim and desire to secure by Letters Patent is:—

1. A pipe coupling comprising a socket, a ball element engaging in said socket, an extension from said ball element in said socket, a ring on said extension in said socket and spaced from the end of said ball element and having passages therethrough, and a gasket mounted on said extension between said ball element and said ring and having an annular groove in its side toward said ring communicating with said passages.

2. A pipe coupling comprising a socket, a ball element having swivel connection with said socket, an extension from said ball element in said socket, a gasket surrounding said extension and having an annular channel in its side toward the end of said extension, and a ring mounted on said extension and having its outer surface bearing against said socket and having one side edge engaging said gasket.

3. A pipe coupling comprising a socket, a ball element, means holding said ball element in swivel communication with said socket, an extension from said ball element in said socket, an elastic ring on said extension bearing against the end of said ball element and having a channel in its side toward the end of said extension, and a ring mounted on said extension having its outer surface bearing against said socket and having one side edge engaging and holding said gasket in position and having passages opening into said channel.

4. A pipe coupling comprising a socket, a ball member in and having metallic contact with the wall of the socket and having a circumferential groove and openings to said groove through one of the side walls thereof, and an annular elastic gasket seated in said groove and having a groove in the side thereof in communication with said openings and having its outer surface in continuation of the outer surface of the ball member and contacting with the wall of said socket.

5. In a pipe coupling, the combination of a casting having a concave inner surface, a cap threaded onto said casting having a concave inner surface complementing the concave inner surface of said casting, a member having a convex outer surface and a cylindrical extension, a ring having vertical passage ways therein mounted on said extension, said ring having a convex surface for contacting with the concave surface of said casting, and an expanding gasket mounted between the ring and said member.

6. In a pipe coupling, the combination of a socket member, a ball member including separated sections arranged to make contact with the wall of the socket member and having a recess in the periphery of the ball member intermediate said sections, a gasket loosely mounted in said recess having walls contacting with the socket member and with the ball member with an internal channel between said walls, the walls of said gasket being movable oppositely by pressure in the coupling to seal the joint between the ball member and the socket member, and a releasable cap in connection with the socket member for holding the parts in assembled relationship.

7. In a pipe coupling, the combination if a socket member having a concave inner surface, a releasable cap having connection with said socket member and having a concave surface in continuation of the concave surface of the socket member, a ball member having a convex surface and an extension of uniform diameter, a member fitting over said extension having vertical passageways therein, said member having a surface contacting with the concave wall of the socket member, and an expanding gasket mounted between said last-named member and the ball member, and having an annular channel in its side edge opposite from said ball member and toward said last named member.

8. In a pipe coupling, the combination of a socket member having a concave inner surface, a ball member having a convex surface with an annular recess in its periphery and vertical passageways from one end thereof, an expanding gasket mounted in said recess, said gasket having a vertical channel therein in communication with said passageways, and the walls of said gasket being free to move in opposite directions by the pressure admitted to the channel from the passageways, whereby a tight seal is effected between the ball member and the socket member.

BARNETT MORSE BROWNELL.